(12) United States Patent
Reighard et al.

(10) Patent No.: US 7,229,678 B2
(45) Date of Patent: *Jun. 12, 2007

(54) BARRIER LAMINATE STRUCTURE FOR PACKAGING BEVERAGES

(75) Inventors: Tricia Susan Reighard, Loveland, OH (US); Christopher S. Cleveland, Cincinnati, OH (US); Richard A. Tedford, Jr., Loveland, OH (US)

(73) Assignee: Evergreen Packaging Inc., Memphis, TN (US)

( * ) Notice: Subject to any disclaimer, the term of this patent is extended or adjusted under 35 U.S.C. 154(b) by 322 days.

This patent is subject to a terminal disclaimer.

(21) Appl. No.: 10/428,147

(22) Filed: May 1, 2003

(65) Prior Publication Data

US 2004/0005389 A1    Jan. 8, 2004

Related U.S. Application Data

(60) Provisional application No. 60/376,875, filed on May 2, 2002.

(51) Int. Cl.
*B29D 22/00* (2006.01)
*B29D 23/00* (2006.01)
*B32B 1/08* (2006.01)

(52) U.S. Cl. ............... 428/34.3; 428/34.2; 428/36.7; 428/35.7; 428/511; 428/513; 428/476.1; 428/476.9; 428/479.6; 427/411

(58) Field of Classification Search .............. 428/36.7, 428/476.1, 476.9, 479.6, 34.2, 35.7, 511, 428/34.3, 513; 427/411
See application file for complete search history.

(56) References Cited

U.S. PATENT DOCUMENTS

| | | | |
|---|---|---|---|
| 4,698,246 A | 10/1987 | Gibbons et al. | 428/35 |
| 4,701,360 A | 10/1987 | Gibbons et al. | 428/35 |
| 4,789,575 A | 12/1988 | Gibbons et al. | 428/34.2 |
| 4,802,943 A * | 2/1989 | Gibbons et al. | 156/244.23 |
| 4,859,513 A | 8/1989 | Gibbons et al. | 428/34.2 |
| 4,861,526 A | 8/1989 | Gibbons et al. | 264/22 |
| 4,880,701 A | 11/1989 | Gibbons et al. | 428/34.2 |
| 4,888,222 A | 12/1989 | Gibbons et al. | 428/34.2 |
| 4,929,476 A | 5/1990 | Gibbons et al. | 428/34.2 |
| 4,940,612 A | 7/1990 | Gibbons et al. | 428/34.2 |
| 4,948,640 A | 8/1990 | Gibbons et al. | 428/34.9 |
| 4,981,739 A | 1/1991 | Gibbons et al. | 428/34.2 |
| 4,983,431 A | 1/1991 | Gibbons et al. | 428/34.2 |
| 5,059,459 A | 10/1991 | Huffman | 428/34.2 |
| 5,114,626 A | 5/1992 | Huffman | 264/80 |
| 5,116,649 A | 5/1992 | Massouda | 428/34.2 |
| 5,712,006 A | 1/1998 | Marono et al. | 428/34.2 |
| 6,110,548 A | 8/2000 | Kinsey | 428/34.2 |
| 6,149,993 A | 11/2000 | Parks et al. | |
| 6,193,827 B1 * | 2/2001 | Parks et al. | 156/82 |
| 6,346,332 B1 | 2/2002 | Bryden et al. | |
| 2004/0037983 A1 * | 2/2004 | Reighard et al. | 428/36.7 |

FOREIGN PATENT DOCUMENTS

| | | |
|---|---|---|
| JP | 9-52299 | 2/1997 |
| JP | 10-1130 | 1/1998 |
| JP | 2000225670 | 8/2000 |
| WO | WO 9201558 | 2/1992 |
| WO | WO 97 11838 | 4/1997 |
| WO | WO 97 15436 | 5/1997 |
| WO | WO 00 76862 | 12/2000 |

* cited by examiner

*Primary Examiner*—Michael C. Miggins
(74) *Attorney, Agent, or Firm*—Donald E. Hasse; Hasse & Nesbitt LLC

(57) ABSTRACT

A barrier laminate packaging material comprising from its outermost surface to the innermost surface contacting the contents of the container to be prepared therefrom, a first exterior layer of a low density polyethylene polymer, a paperboard substrate, a first interior layer laminate coating of nylon with a tie resin layer, a blown film layer comprising a first low density polyethylene polymer layer, a tie layer, a first interior layer of EVOH, a second tie layer, a second interior layer of EVOH, a third tie layer and a second interior layer of low density polyethylene polymer, and an innermost product contacting layer of low density polyethylene.

22 Claims, No Drawings

BARRIER LAMINATE STRUCTURE FOR PACKAGING BEVERAGES

REFERENCE TO RELATED APPLICATION

This application claims priority of provisional patent application Ser. No. 60/376,875 filed May 2, 2002.

BACKGROUND OF THE INVENTION

The present invention relates to paperboard laminates, and more particularly to a non-foil paperboard laminate useful for making containers for products such as alcoholic beverages, including wine, sake and the like as well as other beverages wherein the laminate has good oxygen barrier characteristics as well as the ability to protect the products therein against humidity.

In Asia, alcoholic beverages, such as wine, sake and the like, are packaged in a wide variety of materials, including paperboard based containers. In order to protect the product from oxygen and eventual spoilage, the container construction usually consists of a multilayer structure comprised of aluminum foil, polyethylene terephthalate, metallized polyethylene terephthalate, or a combination of at least two of these in a multilayer structure. Foil has proved to be the best oxygen barrier, but it is relatively expensive and difficult to convert into a carton without cracking or developing pin holes.

The object of the present invention is to produce an improved alcoholic beverage packaging heat-sealable material for wine, sake, or other alcoholic beverage cartons, which does not transmit oxygen and humidity or moisture and exhibits a good heat-seal structure for product shelf lives of six months or longer.

SUMMARY OF THE INVENTION

The above objects are achieved by the present invention which is directed to a non-foil composite structure providing a substantial barrier to oxygen, moisture and humidity and which is easily sealable. The preferred embodiment comprises from the outer surface to the inner surface contacting the contents of the container: a first layer of polyolefin applied onto the exterior surface of the paperboard substrate, a polyamide layer applied onto the interior surface of the paperboard substrate, a film laminated to the polyamide layer via an appropriate tie resin, and a second and innermost layer of polyolefin applied to the film that will contact the contents of the container. The preferred film consists of a first polyolefin layer, a tie layer, a first interior layer of ethylene vinyl alcohol copolymer, a second tie layer, a second interior layer of ethylene vinyl alcohol copolymer, a third tie layer, and a second layer of polyolefin.

DETAILED DESCRIPTION OF THE INVENTION

The relative amounts of each material and their respective structures are listed as coat weight ranges in pounds per 3,000 feet squared (lb/3 msf). The basestock consists of a bleached board with a basis weight of 100–300 lb/3 msf.

| STRUCTURE A: Laminated Film Structure | | |
|---|---|---|
| LAYER | COATWEIGHT (lb/3 msf) | MATERIAL |
| 1 | 8–20 | Polyolefin |
| 2 |  | Basestock |
| 3 | 2–10 | Polyamide |
| 4 | 5–20 | Tie resin |
| 5 | 50–70 | Film (Structure B) |
| 6 | 5–15 | Polyolefin |

Structure A contains a paperboard substrate 2 (100–300 lbs.) onto which there is applied on one side an extrusion coating of polyolefin polymer 1 such as low density polyethylene at a coating weight of 8–20 lbs. and preferably about 12 lbs. to provide the outer surface of the laminate. Layer 1 is the outer "gloss" layer. Preferably, the polyolefin polymer is polyethylene and most preferably, a low density polyethylene. Typical of the preferred low density polyethylenes which can be employed in layer 1 are Tenite 1924P available from Voridian, Kingsport, Tenn. and Chevron 4517 available from Chevron Phillips Chemical Co., Houston, Tex.

On the interior of the substrate 2, there is applied a polyamide layer 3 (2–10 lbs.) The polyamide polymer layer can be, but is not limited to, nylon 6, nylon 66, nylon 10, nylon 6–10, nylon 12, amorphous nylons, MXD-6, nylon nanocomposites, and other suitable polyamides. One appropriate nylon 6 material is Honeywell B73QP (Morristown, N.J.). Onto the inner surface of layer 3 is applied a tie layer 4 (5–20 lbs.) preferably based on, but not limited to, ethylene-based copolymers modified with maleic anhydride functional groups such as Plexar 5125 produced by MSI Technologies. The polyamide layer 3 and the tie layer 4 are used to laminate the film 5 to the basestock 2. Coat weight of the film 5 is about 50–70 lbs. There is then applied to the underside of the film layer 5, a polyolefin layer 6 that is preferably a polyethylene such as low density polyethylene or metallocene.

Structure B is preferably a blown film containing multiple layers of ethylene vinyl alcohol copolymer for oxygen barrier. The film laminate is preferred over coextrusion coating to allow production of the entire structure in a single pass operation and for the improved physical properties of the film such as improved tear, greater stiffness, and burst resistance. One preferred supplier of the film is FlexTech (Cincinnati, Ohio).

| STRUCTURE B: Film Structure | | |
|---|---|---|
| LAYER | COATWEIGHT (lb/3 msf) | MATERIAL |
| 10 | 5–20 | Polyolefin |
| 20 | 3–5 | Tie resin |
| 30 | 2–5 | EVOH |
| 40 | 3–20 | Tie resin |
| 50 | 2–5 | EVOH |
| 60 | 3–5 | Tie resin |
| 70 | 5–20 | Polyolefin |

The ethylene alcohol copolymer (EVOH) in layers 30 and 50 is used as the primary oxygen barrier material in the laminate structure. EVOH materials ranging from 25–48 mole % ethylene may be used. At a comparable coat weight, EVOH is a superior oxygen barrier to polyethylene terephthalate (PET). A preferred supplier of EVOH is Soarus LLP (Arlington Heights, Ill.).

The polyolefin layers 10 and 70 provide moisture resistance for the EVOH layers 30 and 50 and mechanical strength for the film. The tie layers 20, 40, and 60 are preferably based on, but not limited to, ethylene based copolymers modified with maleic anhydride functional groups. A preferred embodiment of the invention involves the use of a high density polyethylene based tie resin in layer 40 for added moisture resistance.

In the overall laminate structure A, the initial and final polyolefin layers are used as waterproof layers to contain the liquid product and protect the interior polymers and basestock from moisture. These polyolefin layers also allow for heat sealability of the laminate and the carton and caulk any holes or channels that may result from the multiple folds. The additional polyolefin layers provide added moisture resistance and mechanical strength to the interior of the multilayer structure. The polyamide layer is extruded onto the bleached board primarily to improve thermal resistance, mechanical strength, and durability. The tie resins are used to promote adhesion between two polymers that would not normally adhere to one another. The freshness of the product can be further extended by decreasing the rate of oxygen ingress into the package. Ethylene vinyl alcohol copolymer is used as the oxygen barrier material. The current invention utilizes an ethylene vinyl alcohol copolymer material (EVOH) comprised of 29 mole percent ethylene. At a comparable coat weight, EVOH is a superior oxygen barrier to PET (polyethylene terephthalate).

In a second embodiment of the invention one of the EVOH layers is replaced with any polyethylene terephthalate or amorphous or semi-crystalline polyamide. In other embodiments of the invention, the EVOH layer or layers may be replaced with oxygen scavenging EVOH materials, EVOH nanocomposites, or blends of EVOH with polyolefins such as low density polyethylene, polyamides, or polyethylene terephthalates. EVOH base resins containing from 25–48 mole % ethylene may be used in any of these embodiments.

The initial and final polyolefin layers are preferably low density polyethylene but can also be replaced with linear low density polyethylene (LLDPE), metallocene low density polyethylene, or blends of these and other materials in order to improve sealing.

The present invention has produced a suitable container which has excellent barrier properties utilizing a laminate which can be securely heat sealed. The laminates not only exhibit significant barrier properties to extend the shelf life of the beverage (wine, sake or the like) but the laminates can be produced using the conventional equipment.

The preferred embodiments of the present invention are constructed as follows:

The polyolefin layer 1 is extrusion coated onto the substrate 2. The polyamide layer 3 and tie layer 4 are then deposited as a coextrusion coating to laminate the film 5 to the substrate 2. The polyolefin layer 6 is then applied over the film 5, yielding Structure A. While this is one method of forming Structure A, other methods can be employed to result in the same final structure.

The completed laminate can now be heat sealed from front to back (polyolefin to polyolefin) at conventional temperatures (250° F. to 500° F.). The newly formed laminates can be employed in the manufacture of containers for alcoholic beverages or other liquid product containers such as for example cartons, folding square or rectangular containers or boxes, pouches, cups, and even cylindrical tubes.

The unique barrier effect and physical properties provided by the laminates of the present invention can be appreciated from the following examples.

EXAMPLES

Example 1

Four structures (C1–C4) were evaluated for barrier and physical properties in relation to Structure A. The structures with their coat weights (lb/3 msf) specific to this series of tests are listed in Table 1.

TABLE 1

Structures Evaluated

| A | C1 | C2 | C3 | C4 |
|---|----|----|----|----|
| 12 LDPE | 12 LDPE | 12 LDPE | 12 LDPE | 12 LDPE |
| 205 Basestock | 265 Basestock | 205 Basestock | 265 Basestock | 265 Basestock |
| 5 Nylon | 16 LDPE Foil | 80 LDPE | 5 Nylon | 5 Nylon |
| 7 Tie | 4 Tie | | 14 Tie | 14 Tie |
| 57 Blown Film (B)* | | | 4 Tie | 4 Tie |
| 11 LDPE | 30 LDPE | | 4 EVOH | 4 EVOH |
| | 18 LLDPE | | 4 Tie | 4 Tie |
| | | | 8 LDPE | 8 LDPE |
| | | | 41 LLDPE/LDPE Blend** | |

*See Table 2 for Structure B
**The blend is 80 wt% LLDPE and 20 wt% LDPE.

TABLE 2

| Structure B |
|---|
| 15 LDPE |
| 3 Tie |
| 3 EVOH |
| 15 Tie |
| 3 EVOH |
| 3 Tie |
| 15 Tie |

Structure A exemplifies the invention as described above. Structures C1–C4 are control structures. C1 is a foil-based material with a thick coat weight of LDPE and LLDPE for additional tear and seal strength. C2 is comprised of a very heavy coat weight of LDPE. C4 is similar to commercially available structures for liquid packaging. Finally, C3 is a modification of C4 with a heavy layer of LDPE and LLDPE for determining if it improves the seal strength.

The water vapor (WVTR) and oxygen (OTR) transmission rates for the five structures are listed in Table 3. The WVTR testing was conducted at 38° C. and 90% relative humidity (RH). The OTR values were measured at 23° C./50% RH and 23° C./75% RH.

TABLE 3

Barrier Values for Evaluated Structures

| | Structure A | C1 | C2 | C3 | C4 |
|---|---|---|---|---|---|
| WVTR (38° C., 90% RH) (g/100 in²/day) | 0.031 | 0.005 | 0.059 | 0.057 | 0.059 |
| OTR (23° C., 50% RH) (cc/100 in²/day) | 0.015 | 0.009 | 15.915 | 0.018 | 0.013 |
| OTR (23° C., 75% RH) (cc/100 in²/day) | 0.049 | 0.015 | 22.268 | 0.028 | 0.036 |

With respect to WVTR, C1 performed significantly better than the other structures. Of the four non-foil structures, A demonstrated the lowest rate of vapor transmission. C2, C3, and C4 were relatively equal in performance. This is somewhat surprising when considering that C2 and C3 have considerably higher LDPE coatweights than C4. LDPE is generally considered an excellent water vapor barrier, and greater coatweights should result in lower transmission rates.

In slowing oxygen transmission, C1 performed the best at both sets of environmental conditions. At 50% RH, structure A, C3 and C4 possessed transmission rates that were slightly higher than C1. C2 does not contain an oxygen barrier material, and therefore it performed very poorly in these measurements.

At 75% RH, the OTR values for the five structures increased. As expected, the foil structure, C1, experienced the smallest increase. The three multi-layer structures performed about the same. Structure C2 continued to perform very poorly as an oxygen barrier.

Example 2

The physical measurements of Structures A and C2 are listed in Table 4. The results of the comparison are proper because the basis weights of the paperboards and the polymer coat weights in each structure are the same. Where applicable, measurements were taken in the machine (MD) and cross directions (CD).

TABLE 4

Physical Measurements of the Evaluated Structures

| Test Parameter | Structure A | C2 |
|---|---|---|
| Mullen Burst (lb/in²) | 211 | 204 |
| Mullen Burst Wet (lb/in²) | 130 | 120 |
| Stiffness (Taber)-MD (g-cm) | 316.8 | 283.2 |
| Stiffness (Taber)-CD (g-cm) | 150.4 | 115.8 |
| Stiffness (Taber) Wet-MD (g-cm) | 108 | 97 |
| Stiffness (Taber) Wet-CD (g-cm) | 52 | — |
| Tear-MD (g) | 649.9 | 597.7 |
| Tear-CD (g) | 802.3 | 643.2 |
| Tear-MD-Wet (g) | 983.0 | 757.9 |
| Tear-CD-Wet (g) | 1339.9 | 910.0 |
| Tensile-MD (lb/in) | 82.0 | 73.6 |
| Tensile-CD (lb/in) | 37.5 | 32.9 |
| Tensile-MD-Wet (lb/in) | 18.5 | 15.7 |
| Tensile-CD-Wet (lb/in) | 10.9 | 9.5 |

Modest improvements in dry and wet burst (Mullen), stiffness (Taber), and tensile strength were observed when the LDPE was replaced by the blown film lamination.

Substantially significant improvements to the tear strength were observed with increases of 52.2 g (MD) and 159.1 g (CD) were observed. This can be attributed to the differences in the stiffness of the polymers in A and C2 as well as the biaxial orientation of the blown film.

After the samples had been wet, the board weakened to the point where the tear properties of the polymers began to dominate. In the case of C2, the MD and CD tear strengths increased by 160.2 g and 266.8 g, respectively. For Structure A, the MD and CD tear strengths increased by 333.1 g and 537.6 g, respectively. These contributions from the polymeric materials serve to prevent tearing of the liquid package under wet and extremely humid conditions.

A dramatic difference between A and C2 under wet conditions was also found. The margin of difference in the MD increased from 52.2 g to 225.1 g. The CD tear strength increased from 159.1 g to 429.9 g. For package designs that involve many folds with sharp angles, Structure A will provide additional resistance to tearing and package failure. This is also true for added resistance to failure under drop conditions during distribution and consumer handling.

The seal strengths of the five structures are listed in Table 5.

TABLE 5

Seal Strength Measurements

| | Structure A | C1 | C2 | C3 | C4 |
|---|---|---|---|---|---|
| Seal Strength (lb/in) | 10.7 | 10.0 | 3.5 | 16.6 | 7.3 |

Compared to C4, there is added seal strength through both increased coatweights of the sealing layer as well as the presence of LLDPE in C1 and C3. This was not found to apply to C2. Seal quality is also improved by an increased heat capacity of the overall structure as Structure A, C1, C3, and C4 will absorb more heat and hold it longer than C2.

What is claimed is:

1. A laminated packaging material comprising:
   a paperboard substrate, having an inner surface and an outer surface;
   an outer layer of heat-sealable polyolefin polymer coated on said outer surface of said paperboard substrate;
   a polyamide layer coated on said inner surface of said paperboard substrate; a tie layer coated on the inner surface of said polyamide layer; and
   a blown-film layer comprising an outer layer of polyolefin polymer, a tie layer, a first layer of ethylene vinyl alcohol copolymer, a second tie layer, a second layer of ethylene vinyl alcohol copolymer, a third tie layer and a second and final layer of polyolefin, said blown-film layer being coated on the inner surface of said tie layer coated on the inner surface of said polyamide layer; and an innermost layer of polyolefin coated on said final layer of polyolefin of said film layer.

2. A laminated packaging material according to claim 1 wherein each of said tie layers comprises an ethylene based copolymer modified with maleic anhydride functional groups.

3. A laminated packaging material according to claim 1 wherein at least one of said tie layers comprises an ethylene based copolymer modified with maleic anhydride functional groups.

4. A laminated packaging material according to claim 1 wherein said ethylene vinyl alcohol copolymer comprises 25–48 mole % ethylene.

5. A container for alcoholic beverages, said container being constructed from a laminate according to claim 1.

6. An oxygen and humidity barrier laminate structure blank for producing an oxygen and humidity impermeable container constructed from a laminate according to claim 1.

7. The material according to claim 1, wherein the first layer comprises low density polyethylene.

8. The material according to claim 1, wherein at least one of said tie layers comprises anhydride modified linear low density polyethylene.

9. The material according to claim 1, wherein at least one of the first or second polyolefin polymer layers of the blown-film layer comprises low density polyethylene.

10. The material according to claim 1, wherein the polyamide layer comprises nylon.

11. The material according to claim 1, wherein
at least one of said tie layers comprises anhydride modified linear low density polyethylene;
at least one of the first or second polyolefin polymer layers of the blown-film layer comprises low density polyethylene; and
the polyamide layer comprises nylon.

12. A laminated packaging material according to claim 1 comprising from the outer surface to the inner surface contacting the container's contents:
a) a first layer of polyolefin in a coating weight of 8–20 lbs/3 msf coated on said exterior surface of said paperboard substrate;
b) a paperboard substrate with a basis weight of 100–300 lbs/3 msf having an interior and an exterior surfaces;
c) a layer of polyamide in a coating weight of 2–10 lbs/3 msf applied onto said interior surface of said paperboard substrate;
d) a tie layer in a coating weight of 5–20 lbs/3 msf applied onto said interior surface of the polyamide layer;
e) a blown-film layer comprising a first polyolefin layer of 5–20 lbs/3 msf, a first tie layer of 3–5 lbs/3 msf, a first ethylene vinyl alcohol copolymer layer of 2–5 lbs/3 msf, a second tie layer of 3–20 lbs/3 msf a second ethylene vinyl alcohol copolymer layer in an amount of 2–5 lbs/3 msf, a third tie layer in an amount of 3–5 lbs/3 msf, and a second polyolefin layer in an amount of 5–20 lbs/3 msf; and
f) a second and innermost layer of polyolefin in an amount of 5–15 lbs/3 msf coated on said interior surface of the film layer.

13. A container for alcoholic beverages, said container being constructed from a laminate according to claim 12.

14. The material according to claim 12, wherein the first layer comprises low density polyethylene.

15. The material according to claim 12, wherein at least one of said tie layers comprises anhydride modified linear low density polyethylene.

16. The material according to claim 12, wherein at least one of the first or second polyolefin polymer layers of the blown-film layer comprises low density polyethylene.

17. The material according to claim 12, wherein the polyamide layer comprises nylon.

18. The material according to claim 12, wherein
at least one of said tie layers comprises anhydride modified linear low density polyethylene;
at least one of the first or second polyolefin polymer layers of the blown-film layer comprises low density polyethylene; and
the polyamide layer comprises nylon.

19. The material according to claim 12, wherein the first layer comprises low density polyethylene;
at least one of said tie layers comprises anhydride modified linear low density polyethylene;
at least one of the first or second polyolefin polymer layers of the blown-film layer comprises low density polyethylene; and
the polyamide layer comprises nylon.

20. A process for improving the oxygen and humidity barrier properties of a laminate comprising the steps of
a) coating an outer layer of polyolefin onto the outer surface of a paperboard substrate,
b) coating a layer of polyamide onto the inner surface of the paperboard substrate,
c) coating a tie layer on the inner surface of said polyamide layer,
d) applying a blown-film layer comprising a first polyolefin polymer layer, a tie layer, a first interior layer of EVOH, a second tie layer, a second interior layer of EVOH, a third tie layer, and a second interior layer of polyolefin polymer, and
e) coating a polyolefin layer on said last mentioned polyolefin layer of said blown-film layer, which polyolefin layer comprises the innermost and beverage contact layer.

21. A laminated packaging material comprising:
a paperboard substrate, having an inner surface and an outer surface;
an outer layer of heat-sealable polyolefin polymer coated on said outer surface of said paperboard substrate;
a polyamide layer coated on said inner surface of said paperboard substrate; a tie layer coated on the inner surface of said polyamide layer; and
a blown-film layer comprising:
(a) an outer layer of polyolefin polymer,
(b) a tie layer;
(c) a first layer comprising at least one of:
polyethylene terephthalate, amorphous polyamide, semi-crystalline polyamide, oxygen scavenging EVOH, EVOH nanocomposite, a blend of EVOH with at least one polyolefin, a blend of EVOH with at least one low density polyethylene, a blend of EVOH with at least one polyamide, and a blend of EVOH with at least one polyethylene terephthalate;

(d) a second tie layer;
(e) a second layer comprising at least one of:
polyethylene terephthalate, amorphous polyamide, semi-crystalline polyamide, oxygen scavenging EVOH, EVOH nanocomposite, a blend of EVOH with at least one polyolefin, a blend of EVOH with at least one low density polyethylene, a blend of EVOH with at least one polyamide, and a blend of EVOH with at least one polyethylene terephthalate;
(f) a third tie layer and a second and final layer of polyolefin;

said blown-film layer being coated on the inner surface of said tie layer coated on the inner surface of said polyamide layer; and an innermost layer of polyolefin coated on said final layer of polyolefin of said blown-film layer.

22. A container for alcoholic beverages, said container being constructed from a laminate according to claim 21.

* * * * *